3,235,487
SEWAGE TREATMENT PROCESS
Warren C. Westgarth, Carrboro, N.C., assignor to FMC Corporation, a corporation of Delaware
No Drawing. Filed Feb. 4, 1963, Ser. No. 256,151
10 Claims. (Cl. 210—6)

The present invention relates to method and apparatus used in the treatment of sewage and industrial wastes. More particularly, it relates to modifications of activated sludge treatment processes. Still more particularly, it relates to a process for treating aqueous sewage involving development of sludges under aerobic conditions coupled with deliberately induced periods of anaerobiosis.

In accordance with the present invention, liquid medium containing organic matter such as primary effluent is treated in an aeration tank in the presence of recycle sludge by passage of oxygenating gases therethrough in the form of dispersed bubbles. Sludge produced by the oxygenating treatment is separated from clear effluent and such return activated sludge is brought to and held in an anaerobic state. Usually, detention is for a period from 1 to 7 hours. Subsequently, the anaerobically treated sludge, in toto or in part, is introduced into the areation tank.

An advantage of this system of treatment is that the active biological floc is more stable than that obtained in conventional activated sludge processes. Also, the flocs produced are very dense, compact readily, and are not susceptible to unbalances which result in development of the so-called "bulking" characteristics of biological flocs obtained in conventional activated sludge systems.

The present process gives a more complete breakdown of the dissolved solids in the aqueous medium being treated to liquids and gases so that the total weight of solids eventually to be wasted from the system can be reduced as much as 50%. Alternatively, if reduced wastage is not a primary requisite, the modified system may be operated to accomplish reduction in the total amount of oxygen or air required for treatment of the aqueous sewage.

Anaerobiosis is a condition arising due to an inadequate supply of oxygen for the living organisms present in a liquid medium. In the activated sludge process, the oxygen supply to the sludge forming organisms is interrupted when the mixed liquor leaves the aerator, since small quantities of dissolved oxygen available in the mixed liquor are rapidly depleted before the, for example, return sludge passes to a treatment zone where oxygen is again available. Such an anaerobic period is somewhat shorter than the time required for circulation of sludge back to an aeration zone. For this reason, it was generally believed that an anaerobic period produced a stale sludge which seriously impaired the functioning of the purification process and was of no benefit and therefore activated sludge should be recirculated from a settling tank or clarifier back to the aerator as fast as possible to permit maintaining the sludge under aerobic conditions.

Briefly, the method of the present invention comprises aerating liquor containing organic matter in a suitable holding zone where a multiplicity of air diffusers are positioned to effect a dispersion of air throughout the liquor and make oxygen available in quantities to meet the B.O.D. requirements of the organisms.

Treatment of aqueous sewage in the instant process may involve B.O.D. loading of the aeration tank at rates associated with either conventional treatment or the so-called high rate treatments. In the conventional form of activated sludge process, the aeration tank loading is about 25 to 35 pounds of biochemical oxygen demand (B.O.D.) per day per thousand cubic feet of aerator volume. In the high loading rate processes, such as step aeration, etc., loading rates exceed about 50 pounds of B.O.D. per thousand cubic feet of aerator volume. The process of this invention shows marked effectiveness when operating for complete treatment of the organic polluted liquid or sewage irrespective of the loading rate but the process shows even greater effectiveness as the B.O.D. loading is increased. In general, it is preferred to operate with B.O.D. loadings in the range between about 50 pounds and 250 pounds, and preferably at B.O.D. loadings in the range between about 80 and 130 pounds of B.O.D. per day per thousand cubic feet of aerator volume.

The detention period for the mixed liquor in the aeration tank is dependent upon the sewage strength, concentration of the suspended solids carried in the mixed liquor, etc.

Upon completion of between 30 minutes and several hours of aeration, aerobically treated sewage is periodically or continuously moved through a communication conduit from the aeration tank to a settling tank, or tanks. In the settling tank, liquid velocity is reduced so that the solids settle, and a clear liquor overflows as weir at the liquid level. Such effluent liquor is discharged through an effluent channel to subsequent treatment such as chlorination or is discharged from the system.

Sludge collected in the lower part of the clarifier or settling chambers or tanks is permitted a minimum practical retention time, i.e., a minimum time for collection of a layer of sludge. A minimum practical retention time is usually about 30 minutes, and unless there are unusual sludge settling conditions, the maximum time for sludge to be retained in the settling tanks is about 3 hours. Sludge, accumulated in the settling tanks, is pumped as soon as an appropriate solids concentration is attained, to a holding tank where the sludge is maintained in suspension by suitable agitation. Residence time for the sludge in the holding tank is dependent upon the quantities of sludge being recycled and the volume of the holding tank. Inasmuch as the conditions in the settling tank are such that any dissolved oxygen in the accumulated suspension is quickly depleted, it is generally preferred for practical reasons that the total time of accumulating the sludge plus holding the sludge should not exceed about 7 hours.

Separated solids, in quantities necessary to maintain a substantially constant loading in the aeration tank, are segregated for eventual return to the aeration tank as the means for introducing seeding material. In order to maintain control over the process, it is desirable to have a short residence time in the settling tank for the solids to be separated and to maintain as shallow a sludge accumulation zone, as is practically feasible.

Sludge segregated for recirculation is held in a tank whose contents are kept agitated by mechanical means or by introduction of inert gas in the container or tank for a period generally of the order of 1 to 5 hours while maintaining anaerobic conditions.

Agitation in the holding tank should be such as would ordinarily disintegrate agglomerates of solids. Even if the agitation is of a less turbulent nature, it must nevertheless be of such a nature as to avoid sedimentation or settling out of solids. When the sludge is held for an appropriate period under anaerobic conditions, the solids in the system are reduced appreciably, usually in an amount such that the sludge wasted is reduced by between about 25% and about 50% and under some conditions to an even greater extent.

The exact length of the holding time may be varied depending upon the character of the sludge and the capacity of the tank utilized for the anaerobic treatment with holding times for the sludge of up to three days possible without destroying the value of some treated sludges as a seeding material. Generally a holding tank having the desired means for maintaining the tank contents in an agitated condition is provided which will be capable of handling the flow and providing a preferred holding period of between 2 and 4 hours. The anaerobically treated activated sludge may be withdrawn intermittently or continuously for mixing with the aqueous sewage or primary effluent entering the aeration zone.

Alternatively, if the particular sewage treatment system is subject to surges of B.O.D. of unusual magnitude due to local conditions such as unusual wastes being introduced intermittently, the system may be adapted for operating two tanks in parallel, the first tank being adapted for anaerobic treatment of the sludge and being provided with a capacity capable of handling an appreciable part or all of the sludge required for a predetermined level of operation. The second tank is then adapted to hold a second portion of the sludge in amounts required for seeding of sewage during the periods when the B.O.D. of the sewage raises the recycle sludge requirements to a level exceeding the quantity of sludge available from the tank providing regular anaerobic treatment. The second tank may be operated under strictly anaerobic conditions or under conditions providing aeration with periods of holding under anaerobic conditions. Sludge is withdrawn from the second tank as required for mixing with the aqueous sewage or primary effluent entering the aeration zone. The detention time of the sludge in said second holding tank should not exceed about 3 days. If this holding will be exceeded, treated solids may be wasted and fresh sludge introduced to maintain an average detention time for solids in the second tank of less than about 3 days.

The advantages of operating in accordance with this invention are illustrated by comparison of plant operations wherein identical holding tanks are fed from parallel operating aeration tanks which received primary effluent from a common primary settling tank. Primary effluent feed to the aeration tanks in tests indicated as A and B contained approximately 180 mg. per liter of B.O.D. and 125 mg. per liter of solids. Tests A and B were conducted when maintaining a B.O.D. loading in the aeration tanks of 220 pounds of B.O.D. per day per 1000 cubic feet of tank volume.

In the circuit of the plant, whose operating data is supplied in column A of the table, aerated mixed liquor is passed to a settling tank and in a recycle operation, sludge is returned directly to the aeration tank.

In the circuit of the plant, whose operating data is supplied in column B of the table, aerated mixed liquor is passed to an identical settling tank. At this point, the circuits follow divergent paths. The sludge accumulated in the settling tank of this circuit was continuously transferred to a holding tank operating under anaerobic conditions, and the sludge held in the tank for an average of 4.5 hours before being pumped as recycle to the aeration tank.

Conditions of operation and the quantities of material wasted are shown in the table. From the table, it can be seen that, when the systems are operated to use approximately the same quantities of oxygen, only about one-half as much sludge must be wasted from the circuit where the sludge passes through an agitated anerobic tank.

The table also contains data on the operation of the same equipment when the B.O.D. loading was at a lower level, i.e., 95 pounds of B.O.D. per 1000 cubic feet of water volume. The data for comparative tests are set forth in columns C and D. In the test, data for which is provided in column C, the circuit was operated in the identical manner to that described relative to the circuit for which data is supplied in column A except for the B.O.D. loading of the aeration tank. At the time of operating the aeration tank, as indicated in column D, the tank was provided with only approximately two-thirds of the oxygen supplied when operating as indicated in column C. From the table, it can be seen that, when operating with an anaerobic treatment tank in the system and drastically reduced oxygenation in the aeration tank, comparable results are obtained with regard to the amount of sludge which must be wasted.

In the following table, some abbreviations are used which are not of the common variety such as, gm. for grams, l. for liter, etc. The meaning of uncommon abbreviations is as follows:

B.O.D.—biochemical oxygen demand
SVI—sludge volume index
ML—mixed liquor in aeration tank
MLSS—mixed liquor suspended solids
SS—suspended solids.
$Qo_2$—specific oxygen uptake
VSS—volatile suspended solids

TABLE

| Plant Parameters | A | B | C | D |
|---|---|---|---|---|
| Approximate Detention, Hours: | | | | |
| Aerators | 1.4 | 1.4 | 4.2 | 4.2 |
| Settling | 2.7 | 2.7 | 2.7 | 2.7 |
| Anaerobic Tanks | | 4.5 | | 4.5 |
| Flow: | | | | |
| Liters/min | 1.51 | 1.37 | 1.45 | 1.40 |
| Liters/day | 2,180 | 1,970 | 2,090 | 2,020 |
| Influent: | | | | |
| B.O.D., mg./l | 180 | 180 | 250 | 250 |
| Solids, mg./l | 125 | 125 | 161 | 161 |
| Effluent: | | | | |
| B.O.D., mg./l | 52 | 47 | 33 | 39 |
| Solids, mg./l | 59 | 60 | 30 | 49 |
| Percent B.O.D. removed | 71 | 72 | 87 | 84 |
| Percent Solids removed | 56 | 53 | 77 | 65 |
| SVI, ml./gm | 105 | 114 | 460 | 89 |
| MLSS, mg./l | 2,193 | 2,113 | 2,028 | 2,790 |
| Percent Volatile ML Solids | 81 | 82 | 75 | 78 |
| 1. Lb. B.O.D./100 lb. MLSS | 162 | 153 | 75 | 60 |
| 2. Lbs. of B.O.D. per day per 1,000 cubic ft. of tank volume | 220 | 220 | 95 | 95 |
| 3. Lb. SS Waste/lb. B.O.D. Added | 0.60 | 0.29 | 0.33 | 0.33 |
| 4. Lb. B.O.D. removed per day/lb. MLSS | 1.08 | 1.19 | 0.70 | 0.47 |
| $Qo_2$, mg. $O_2$/hr./g. VSS | 21.7 | 19.9 | 17.0 | 9.6 |
| Solids: | | | | |
| Influent g./day | 268 | 248 | 352 | 333 |
| Mixed liquor, grams | 237 | 228 | 660 | 950 |
| Return Sludge, g./day | 8,030 | 6,700 | 7,170 | 10,400 |
| Effluent, g./day | 117 | 118 | 66 | 103 |
| Waste, g./day | 222 | 110 | 175 | 166 |

The above-detailed description of this invention has been given by way of illustration without any intention that the invention be limited to the exact conditions set forth. No unnecessary limitations should be understood therefrom, as modifications will be obvious to those skilled in the art.

I claim:

1. The process of purifying an organic-polluted liquid which comprises mixing untreated polluted liquid with seeding material in the form of sludge segregated for recirculation and which has been held under anaerobic conditions to form a body of aqueous mixture for direct introduction into a zone or aeration, introducing air into said body of aqueous mixture for a period and in quantities to satisfy a major portion of the B.O.D. introduced into said body of aqueous mixture, flowing treated mixture from the body of aqueous mixture to a settling zone, discharging a clarified liquid from said settling zone, withdrawing a concentrate of settled solids from said settling zone to a holding zone where said concentrate is maintained in an agitated condition and under anaerobic conditions, the total time for said solids in the settling zone plus the time in said holding zone being for a period of from one to seven hours, withdrawing a portion of the anaerobically treated concentrate from said holding zone and recycling it to the body of mixed liquor as the seeding material and continuing air introduction as long as there is introduction of polluted liquor whereby a reduction in solids remaining in the system to be wasted is attained.

2. The process of purifying an organic-polluted liquid which comprises mixing untreated polluted liquid with seeding material in the form of sludge segregated for recirculation and which has been held under anaerobic conditions to form a body of aqueous mixture for direct introduction into a zone of aeration having a high loading rate as measured by pounds of B.O.D. per thousand cubic feet of body volume, introducing oxygen-containing gas into said body of aqueous mixture for a period and in quantities to satisfy a major portion of the B.O.D. introduced into said body of aqueous mixture, flowing treated mixture from the body of aqueous mixture to a solids separating zone, discharging a clarified liquid from said separating zone, withdrawing a concentrate of solids from said separating zone to a holding zone where said concentrate is maintained in an agitated condition and under anaerobic conditions for a period of from about one to about five hours, continuously withdrawing a portion of the anaerobically treated concentrate and recycling it to the body of aqueous mixture as the seeding material and continuing gas introduction to said aqueous mixture at least as long as there is introduction of polluted liquid.

3. The process of purifying an organic-polluted liquid which comprises mixing untreated polluted liquid with seeding material in the form of sludge segregated for recirculation and which has been held under anaerobic conditions to form a body of aqueous mixture for direct introduction into a zone of aeration, continuously introducing the mixture at a rate maintaining a loading in the body of aqueous mixture in excess of 50 pounds of B.O.D. per thousand cubic feet of body volume, introducing oxygen-containing gas into said body of aqueous mixture for a period and in quantities to satisfy a major portion of the B.O.D. introduced into said body of aqueous mixture, continuously flowing treated liquids from the body of aerated aqueous mixture to a separating zone, discharging a clarified liquid from said separating zone, withdrawing a concentrate of solids from said separating zone to a holding zone where said concentrate is maintained in an agitated condition and under anaerobic conditions for a period of from one to five hours, continuously withdrawing a portion of the anaerobically treated concentrate and recycling it to the body of aqueous mixture as the seeding material and continuing gas introduction as long as there is introduction of polluted liquor.

4. The process of purifying an organic-polluted liquid which comprises mixing untreated polluted liquid with seeding material in the form of sludge segregated for recirculation and which has been held under anaerobic conditions to form a body of aqueous mixture for direct introduction into a zone of aeration having a loading in the body of liquid in excess of about 50 pounds of B.O.D. per thousand cubic feet of body volume, introducing oxygen-containing gas into said body of aqueous mixture for a period and in quantities to satisfy a major portion of the B.O.D. introduced into said body of aqueous mixture, flowing treated mixture from the body of aqueous mixture to a separating zone, discharging a clarified liquid from said separating zone, withdrawing a concentrate of solids from said separating zone to a holding zone where said concentrate is maintained in an agitated condition and under anaerobic conditions for a period of from about two to about four hours, continuously withdrawing a portion of the anaerobically treated concentrate and recycling it to the body of aqueous mixture as the seeding material and continuing gas introduction as long as there is introduction of polluted liquor.

5. The process of treating sewage which comprises mixing untreated sewage with seeding material in the form of sludge segregated for recirculation and which has been held under anaerobic conditions to form a body of aqueous sewage for direct introduction into a zone of aeration, continuously introducing sewage at a rate maintaining a loading in the body of aqueous sewage in excess of about 50 pounds of B.O.D. per thousand cubic feet of body volume, introducing oxygen-containing gas into said body of aqueous sewage for a period and in quantities to satisfy a major portion of the B.O.D. introduced into said body of aqueous sewage, flowing treated aqueous sewage from said body to a separating zone, withdrawing a concentrate of separated solids from said separating zone to a holding zone, said concentrate being maintained in said holding zone in an agitated condition and under anaerobic conditions for a period of from one to five hours, continuously withdrawing a portion of the anaerobically treated concentrate and recycling it to the body of aqueous sewage as the seeding material and continuing gas introduction as long as there is introduction of polluted liquor.

6. The process of treating sewage which comprises mixing untreated sewage with seeding material in the form of sludge segregated for recirculation and which has been held under anaerobic conditions to form a body of aqueous sewage for direct introduction into a zone of aeration, continuously introducing sewage at a rate maintaining a loading in the body of aqueous sewage in excess of about 50 pounds B.O.D. per thousand cubic feet of body volume, introducing oxygen-containing gas into said body of aqueous sewage for a period and in quantities to supply between 2.5 and 25 cubic feet per minute of air per foot of tank length, flowing treated aqueous sewage from said body to a separating zone, discharge a clarified liquid from said separating zone, withdrawing a concentrate of separated solids from said separating zone to a holding zone, said concentrate being maintained in said holding zone in an agitated condition and under anaerobic condition for a period of from one to five hours, continuously withdrawing a portion of the anaerobically treated concentrate and recycling it to the body of aqueous sewage as the seeding material and continuing gas introduction as long as there is introduction of polluted liquor.

7. The process of purifying an organic-polluted liquid which comprises mixing untreated polluted liquid with seeding material in the form of sludge segregated for recirculation and which has been held under anaerobic conditions to form a body of aqueous mixture for direct introduction into a zone of aeration, introducing air into said body of aqueous mixture for a period and in quantities to satisfy a major portion of the B.O.D. introduced into said body of aqueous mixture, flowing treated material from the body of aqueous mixture to a settling zone, discharging a clarified liquid from said settling zone, wasting part of the accumulated solids, withdrawing a concentrate of settled solids from said settling zone after an average of less than two hours of residence time in said settling zone to a holding zone where said concentrate is maintained in an agitated condition and under anaerobic conditions for a period of settling plus holding under anaerobic conditions of less than about 7 hours, withdrawing a portion of the anaerobically treated concentrate and recycling it to the body of aqueous mixture as the seeding material and continuing air introduction as long as there is introduction of polluted liquor.

8. The process of purifying an organic-polluted liquid which comprises mixing untreated polluted liquid with seeding material in the form of sludge segregated for recirculation and which has been held under anaerobic conditions to form a body of aqueous mixture for direct introduction into a zone of aeration, introducing air into said body of aqueous mixture for a period and in quantities to satisfy a major portion of the B.O.D. introduced into said body of aqueous mixture, flowing treated mixture from the body of aqueous mixture to a settling zone, discharging a clarified liquid from said settling zone, withdrawing a concentrate of solids from said separating zone, separating a portion of said solids concentrate and introducing it into a holding zone where said concentrate is maintained in an agitated condition and under anaerobic conditions, the total time for said solids in the settling zone plus the time in said holding zone being for a period of from one to seven hours, withdrawing anaerobically treated concentrate of solids and recycling it to said body of aqueous mixture, introducing the remainder of said concentrate of solids into a second holding zone where said concentrate is maintained in an agitated condition and under anaerobic conditions, withdrawing a portion of said treated remainder as required based upon B.O.D. loading of the body of aqueous mixture and recycling it to said body as the seeding material, wasting treated remainder and adding new concentrate of solids in amounts maintaining the average detention time of the solids in said second holding zone to less than 3 days, and continuing air introduction as long as there is introduction of polluted liquor.

9. The process of purifying an organic-polluted liquid which comprises mixing untreated polluted liquid with seeding material in the form of sludge segregated for recirculation and which has been held under anaerobic conditions to form a body of aqueous mixture for direct introduction into a zone of aeration, introducing air into said body of aqueous mixture for a period and in quantities to satisfy a major portion of the B.O.D. introduced into said body of aqueous mixture, flowing treated mixture from the body of aqueous mixture to a settling zone, discharging a clarified liquid from said separating zone, withdrawing a concentrate of solids from said separating zone, separating a portion of said solids concentrate and introducing it into a holding zone where said concentrate is maintained in an agitated condition and under anaerobic conditions, the total time for said solids in the settling zone plus the time in said holding zone being for a period of from one to seven hours, withdrawing anaerobically treated concentrate of solids and recycling it to said body of aqueous mixture, introducing the remainder of said solids concentrate into a second holding zone where said concentrate is maintained in an agitated condition and is intermittently aerated, withdrawing a portion of said treated remainder and recycling it to said aqueous mixture as the seeding material, wasting the balance of said treated solids, and continuing air introduction as long as there is introduction of polluted liquor.

10. The process of purifying sewage which comprises mixing untreated sewage with seeding material in the form of sludge segregated for recirculation and which has been held under anaerobic conditions to form a body of aqueous mixture for direct introduction into a zone of aeration, introducing air into said body of aqueous sewage for a period and in quantities to satisfy a major portion of the B.O.D. introduced into said body of aqueous sewage, flowing treated sewage from the body of aqueous sewage to a settling zone, discharging a clarified liquid from said separating zone, withdrawing a concentrate of solids from said separating zone, separating a portion of said solids concentrate and introducing it into a holding zone where said concentrate is maintained in an agitated condition and under anaerobic conditions, the total time for said solids in the settling zone plus the time in said holding zone being for a period of from one to seven hours, withdrawing anaerobically treated concentrate of solids and recycling it to said body of aqueous sewage, introducing the remainder of said solids concentrate into a second holding zone where said concentrate is maintained in an agitated condition and is intermittently aerated, withdrawing a portion of said treated remainder and recycling it to said aqueous sewage as the seeding material, wasting the balance of said treated solids, and continuing air introduction as long as there is introduction of sewage.

References Cited by the Examiner
UNITED STATES PATENTS

| | | | |
|---|---|---|---|
| 1,989,589 | 1/1935 | Fischer et al. | 210—14 |
| 2,517,792 | 8/1950 | Kraus | 210—6 |
| 2,661,332 | 12/1953 | Mortenson | 210—4 |
| 2,875,151 | 2/1959 | Davidson | 210—4 |

OTHER REFERENCES

Ridenour et al.: Stale Return Sludge, etc., Sewage Works J., January 1934, vol. 6, pp. 36–41.

Kraus: The Use of Digested Sludge, etc., Sewage Works J., November 1945, vol. 17, pp. 1177–1190.

Keefer et al.: Activated Sludge Studies, Sewage and Ind. Wastes, August 1953, vol. 25, pp. 898–908.

MORRIS O. WOLK, *Primary Examiner.*